United States Patent [19]
Simandl et al.

[11] Patent Number: 5,855,633
[45] Date of Patent: Jan. 5, 1999

[54] LAPPING SLURRY

[75] Inventors: Ronald F. Simandl, Farragut; Victor S. Upchurch, Powell, both of Tenn.; Michael E. Leitten, Frederick, Md.

[73] Assignee: Lockheed Martin Energy Systems, Inc., Oak Ridge, Tenn.

[21] Appl. No.: 870,572

[22] Filed: Jun. 6, 1997

[51] Int. Cl.$^6$ .................................................... C08K 3/00
[52] U.S. Cl. ........................ 51/308; 51/309; 106/3; 510/418; 510/420
[58] Field of Search ............................ 510/418, 420; 106/3; 51/308, 293, 309

[56] References Cited

U.S. PATENT DOCUMENTS

| | | | |
|---|---|---|---|
| 3,817,727 | 6/1974 | Yancey | 51/298 |
| 4,007,020 | 2/1977 | Church et al. | 51/298 |
| 4,038,048 | 7/1977 | Thower, Jr. | 51/298 |
| 4,089,943 | 5/1978 | Roberts et al. | 51/298 |
| 4,110,083 | 8/1978 | Benedict | 51/298 |
| 4,138,228 | 2/1979 | Hartfelt et al. | 51/298 |
| 4,242,842 | 1/1981 | Yancey | 51/298 |
| 5,009,675 | 4/1991 | Kunz et al. | 51/309 |
| 5,296,008 | 3/1994 | Moriguchi et al. | 51/309 |
| 5,690,539 | 11/1997 | Swidler et al. | 51/308 |
| 5,702,811 | 12/1997 | Ho et al. | 51/298 |

OTHER PUBLICATIONS

Sap et al, *Hawley's Condensed Chemical Dictionary*, 11th Ed., Van Nostrand Reinhold, N.Y., 1987, pp. 1038 and 1072–1073.

*Primary Examiner*—Margaret Medley
*Attorney, Agent, or Firm*—J. Kenneth Davis

[57] ABSTRACT

Improved lapping slurries provide for easier and more thorough cleaning of alumina workpieces, as well as inhibit corrosion of the lapping table and provide for easier cleaning of the lapping equipment. The unthickened lapping slurry comprises abrasive grains such as diamond abrasive dispersed in a carrier comprising water, glycerine, and triethanolamine. The thickened lapping slurry comprises abrasive grains such as diamond abrasive dispersed in a carrier comprising water, glycerine, triethanolamine, a water soluble silicate, and acid.

19 Claims, 1 Drawing Sheet

LAPPING SLURRY

The United States Government has rights in this invention pursuant to contract no. DEAC05-84OR21400 between the United States Department of Energy and Lockheed Martin Energy Systems, Inc.

FIELD OF THE INVENTION

The invention described herein relates generally to lapping compounds and more particularly to lapping slurries, compounds or gels which are used in industrial, production applications for eliminating or minimizing residues on the workpieces and lapping equipment.

BACKGROUND OF THE INVENTION

Lapping is a well-known process of abrasion metal-removal or machining for smoothing or polishing surfaces to a high degree of refinement or accuracy using a loose abrasive lapping compound. The lapping compound is often in a liquid suspension or semi-liquid form, and is called lapping slurry.

The present invention arose out of an effort to improve the cleanliness of parts that had been lapped to certain thickness and roughness specifications, and subsequently ultrasonically cleaned. In at least one instance ceramic wafers of alumina substrates that had been ultrasonically cleaned subsequently had metallized microcircuits applied for use as automobile sensors. Because of suspected surface contamination from the lapping operation, the microcircuits were not adhering properly to the contaminated ceramic substrates. Because it was suspected that residual lapping swarf or lapping carrier residue was interfering with the adherence of the microcircuit, efforts were initiated to more completely clean the workpieces after lapping. However, additional cleaning efforts were not entirely successful in eliminating the problem, and it was then determined that some contaminant adhesive was causing the lapping swarf to adhere to the workpieces. It was later determined that the lapping slurry in use at the time was a major contributor to the contamination problem. The slurry in use consisted of water, triethanolamine, 15–25 um diamond, and xanthan gum.

Xanthan gum is a commonly-used thixotropic component that suspends the diamond abrasive until it arrives on the lapping table. Shear forces then thin the slurry allowing the diamond to drop out onto the ceramic parts. It was found that under the shear forces, the xanthan gum formed into balls which were subsequently smeared onto the ceramic surfaces during the lapping process. This smeared gum acted as an adhesive for the particulate removed from the ceramic surfaces, making cleaning very difficult.

The lapping slurry in use also contributed to other operating problems regarding lapping machine cleanup. When machines are cleaned at the end of a work shift, the large cast iron tables are left unprotected overnight. In the morning, surface rusting is quite extensive, requiring cleanup prior to lapping. The presence of rust on the surface of the ceramic wafers is also a reason for rejection. A second problem also involves the xanthan gum lapping slurry. When lapping machines are unused during weekends, the xanthan gum-alumina swarf sets up like a mortar on the lapping table, and this often causes the first set of lapped parts to jam the machine on Monday morning.

In an effort to eliminate the problems described above, various slurry replacements were tried. One of the replacements was a thixotropic corn starch mixture. While this slurry gave acceptable lapping rates, it left intractable deposits on the lapping machine and on the ceramic workpieces. Another slurry tried was one made of glycerine, triethanolamine, diamond abrasive, and water. This slurry gave excellent lapping times and cleaned up superbly. In addition, this slurry facilitated clean-up of the lapping table. It did not make "mortar" on the lapping table during off shifts. Moreover, residual triethanolamine inhibited surface rusting of the lapping tables. The only problem encountered with this slurry was that it did not suspend the diamond adequately. It was not thixotropic and had to be blended at a low viscosity suitable for lapping. Constant vigorous stirring was required to keep the diamond suspended. Silica gel and other viscosity enhancers proved to be unacceptable.

OBJECTS OF THE INVENTION

Accordingly, it is an object of the present invention to provide a new and improved lapping slurry which permits easier and more complete cleaning of the workpieces after lapping.

It is another object to provide a new and improved lapping slurry which permits easier and more complete cleaning of the lapping equipment.

It is yet another object to provide a new and improved lapping slurry which inhibits rusting and corrosion of the lapping table.

Further and other objects of the present invention will become apparent from the description contained herein.

SUMMARY OF THE INVENTION

In accordance with one aspect of the present invention, the foregoing and other objects are achieved by an unthickened lapping slurry which comprises abrasive grains dispersed in a carrier comprising water, glycerine, and triethanolamine.

In accordance with a second aspect of the present invention, the foregoing and other objects are achieved by a thickened lapping slurry which comprises abrasive grains dispersed in a carrier comprising water, glycerine, triethanolamine, a water soluble silicate.

In accordance with a third aspect of the present invention, the foregoing and other objects are achieved by a method of making a thickened lapping slurry comprising abrasive grains dispersed within a carrier, the method comprising the steps of: combining liquid ingredients water, glycerine, and triethanolamine, to form a first liquid mixture; heating the first liquid mixture to a temperature above about 70° C.; dissolving a water soluble silicate in the first liquid mixture; combining abrasive grains with at least one of said liquid ingredients so that after the heating step, the dissolving step, and the combining step are completed, a second mixture is formed; and while stirring, combining the second mixture with sufficient acid selected from the groups of acids consisting of inorganic acids and organic acids to form a thickened lapping slurry comprising a carrier and abrasive grains, the carrier having a pH of between about 8 and about 10.

Figure 1:
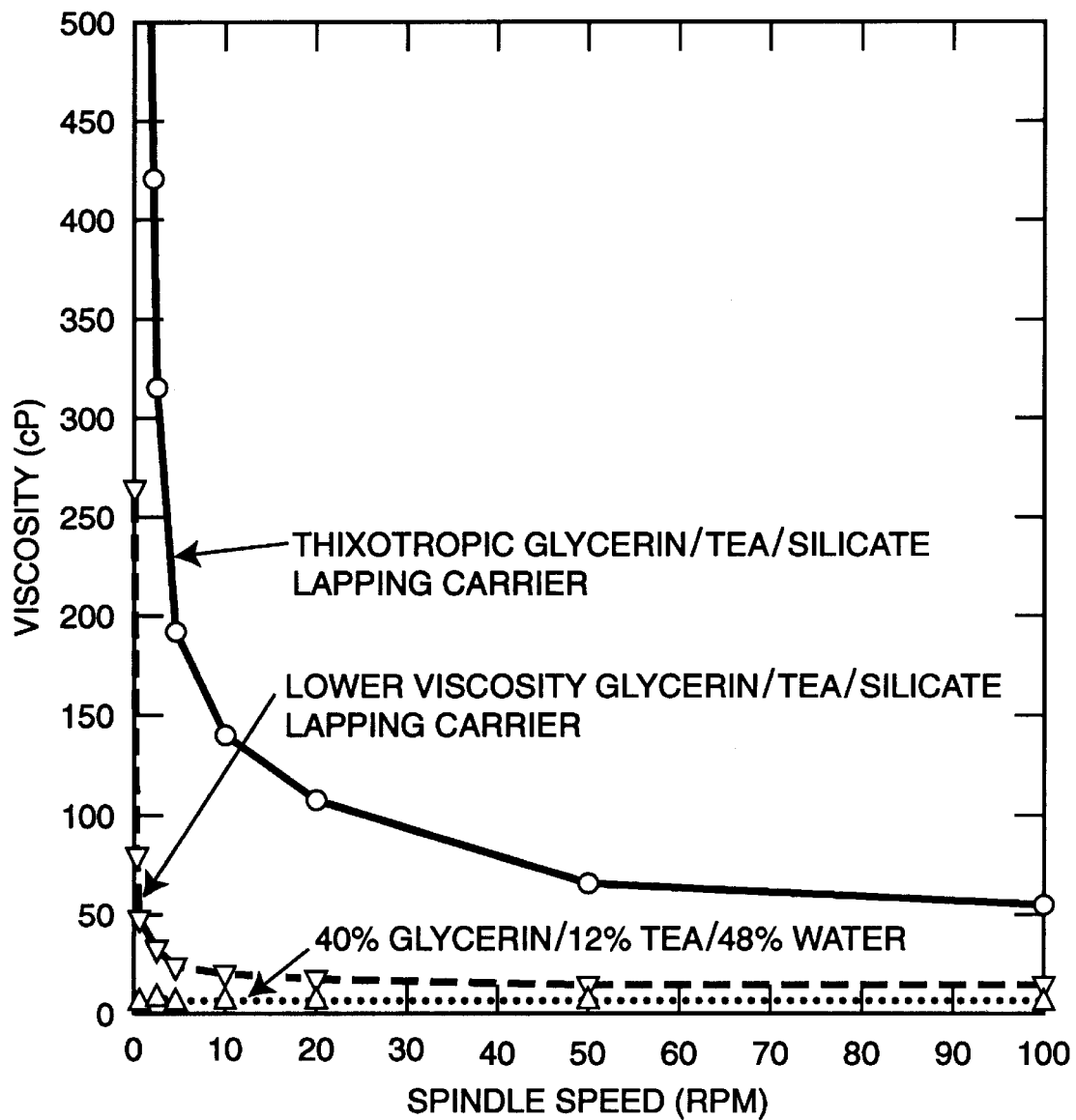
FIG. 1 shows the viscosity of various lapping slurries as a function of spindle speeds.

For a better understanding of the present invention, together with other and further objects, advantages and capabilities thereof, reference is made to the following disclosure and appended claims in connection with the above-described drawing.

DETAILED DESCRIPTION OF THE INVENTION

The present invention comprises abrasive grains dispersed in a carrier. Both thickened and unthickened slurries comprising thickened and unthickened carriers are described herein. The present invention may comprise any of a variety of abrasive grains, of which a large number are well-known to the skilled artisan. Some embodiments described herein comprise diamond abrasive between about 1 um and 100 um, but the invention can be practiced using any type of abrasive grains.

An unthickened slurry may comprise abrasive grains dispersed in a carrier comprising glycerine in an amount less than 80 wt %; and between about 1 wt % and about 70 wt % triethanolamine. More often the carrier may comprise between about 30 wt % and about 50 wt % glycerine; and between about 7 wt % and about 17 wt % triethanolamine.

A preferred unthickened slurry in this application comprises abrasive grains such as diamond abrasive dispersed in a carrier comprising about 40 wt % glycerine, about 12 wt % triethanolamine, and about 48 wt % water.

Another, thickened, lapping slurry found to be effective in this application comprises 0–80 wt % glycerine 1–70 wt % triethanolamine, 5–100 carats/liter of 15–25um diamond abrasive, 0–20% sodium metasilicate ($Na_2SiO_3.9H_2O$) or other water soluble silicate, 0–10% inorganic or organic acid such as acetic, citric, tartaric, malonic, gluconic, or succinic acid, and the remainder water.

A preferred thickened slurry may comprise abrasive grains dispersed in a carrier comprising between about 30 wt % and about 50 wt % glycerine; between about 7 wt % and about 17 wt % triethanolamine; between about 0.1 wt % and about 10 wt % water soluble silicate; and between 0.1 wt % and about 5 wt % of the acid. A more preferred thickened slurry may comprise abrasive grains dispersed in a carrier comprising about 40 wt % glycerine; about 12 wt % triethanolamine; between about 2 wt % and about 4 wt % water soluble silicate; and between 0.1 wt % and enough acid to produce a pH of between about 8 and about 10 in the carrier.

To make a thickened slurry, to the unthickened composition add 2–4 wt % sodium metasilicate and enough acid to lower the pH to the 8–10 range of alkalinity (typically from 0.5 to 3 wt % of the total). The method of addition of acid determines the viscosity of the resulting gel. Typically, the unthickened formula is heated above 70° C. The sodium metasilicate is then dissolved in this heated solution. The acid is added gradually with vigorous stirring. Gentle stirring or the absence of stirring after addition of the acid results in the formation of a well-interconnected gel which is much more viscous than that formed with vigorous stirring.

The thixotropic nature of this gel is shown in FIG. 1. Desirable viscosities are in the 10–20 cP range under shear forces.

Typically, some separation of the water from this gel occurs with time. The diamond abrasive remains suspended in the remaining gel and does not settle to the bottom. This gel can be easily restored with gentle mixing. Gels made with higher concentrations of sodium metasilicate and citric acid are less likely to separate over time, but are much too viscous for use as a lapping slurry.

Cleaning of workpieces after lapping with water is simple and complete. The formulation incorporating glycerine/TEA components gave the best cleaning result. This formulation incorporates a soluble silicate, a commonly-used detergent component which enhances cleaning of the workpieces.

Machine clean-up is also simple. Deposits of this lapping slurry left on steel plates remain wet over weekends and are easily removed with a wet wipe. Residual triethanolamine and soluble silicate protect the lapping tables from corrosion. Citrate ions facilitate cleaning by complexing with iron that is removed from the lapping table.

Another advantage of this lapping slurry is that all components are essentially nontoxic. Citric acid not only forms a gel but also reduces the alkaline corrosivity of the sodium metasilicate to the safe pH range of 9–10.

Other organic acids may also be used in place of citric acid. These include, but are not limited to malonic, gluconic, tartaric, adipic, succinic, and ethylenediaminetetraacetic acid.

In addition, propylene glycol or other polyhydroxy species can be substituted for the glycerine. Alternatively, glycerine may be left out of the slurry entirely. Glycerine, however, provides for some lubricity on the lapping table. Glycerine likewise tends to facilitate clean-up of both the workpieces and the lapping table.

While there has been shown and described what are at present considered the preferred embodiments of the invention, it will be obvious to those skilled in the art that various changes and modifications can be made therein without departing from the scope of the inventions defined by the appended claims.

We claim:

1. An unthickened lapping slurry comprising abrasive grains dispersed in a carrier comprising water, glycerine in an amount less than 80 wt %, and between about 1 wt % and about 70 wt % triethanolamine.

2. The lapping slurry described in claim 1 wherein the abrasive grains are diamond abrasive.

3. The lapping slurry described in claim 2 wherein the diamond abrasive grains are between about 1 um and about 100 um size.

4. The lapping slurry described in claim 2 wherein the amount of diamond abrasive in the lapping slurry is between about 5 and about 100 carats per liter of carrier.

5. The lapping slurry described in claim 1 wherein the carrier comprises between about 30 wt % and about 50% glycerine; and between about 7 wt % and about 17 wt % triethanolamine.

6. The lapping slurry described in claim 3 wherein carrier comprises about 40 wt % glycerine; and about 12 wt % triethanolamine.

7. A thickened lapping slurry comprising abrasive grains dispersed in a carrier comprising water, glycerine in an amount less than 80 wt %, between about 1 wt % and about 70 wt % triethanolamine, and a water soluble silicate in an amount less than 10 wt %.

8. The lapping slurry described in claim 7 wherein the carrier further comprises at least one acid selected from the group of acids comprising inorganic acids and acetic acid, adipic acid, citric acid, ethylenediaminetetraacetic acid, gluconic acid, malonic acid, succinic acid, and tartaric acid.

9. The lapping slurry described in claim 8 wherein the carrier comprises between about 30 wt % and about 50 wt % glycerine; between about 7 wt % and about 17 wt % triethanolamine; between about 0.1 wt % and about 10 wt % water soluble silicate; and between about 0.1% and about 5 wt % of said at least one acid.

10. The lapping slurry described in claim 7 wherein the abrasive grains are diamond abrasive.

11. The lapping slurry described in claim 10 wherein the diamond abrasive grains are between about 1 um and about 100 um size.

12. The lapping slurry described in claim 10 wherein the amount of diamond abrasive in the lapping slurry is between about 5 and about 100 carats per liter of carrier.

13. The lapping slurry described in claim 11 wherein the carrier comprises about 40 wt % glycerine; about 12 wt % triethanolamine; between about 2 wt % and about 4 wt % sodium metasilicate; and between about 0.1% and enough of said at least one acid to produce a pH of between about 8 and about 10 in the carrier.

14. A method of making a thickened lapping slurry comprising abrasive grains dispersed within a carrier, the method comprising the steps of:

(A) Combining abrasive grains with liquid ingredients water, glycerine in an amount less than 80 wt %, and between about 1 wt % and about 70 wt % triethanolamine, to form a first mixture;

(B) Heating the first mixture to a temperature above about 70° C.;

(C) Dissolving a water soluble silicate in the first mixture to form a second mixture; and (D) vigorously stirring, the second mixture and gradually adding sufficient acid selected from the group of acids consisting of inorganic acids and acetic acid, adipic acid, citric acid, ethylenediaminetetraacetic acid, gluconic acid, malonic acid, succinic acid, and tartaric acid to form a thickened lapping slurry comprising a carrier and abrasive grains, the carrier having a pH of between about 8 and about 10.

15. The method described in claim 14 wherein the abrasive grains are diamond abrasive.

16. The method described in claim 15 wherein the diamond abrasive grains are between about 1 um and about 100 um in size.

17. The method described in claim 15 wherein the amount of diamond abrasive in the lapping slurry is about 5 and about 100 carats per liter of carrier.

18. The method described in claim 15 wherein the carrier comprises between about 30 wt % and about 50 wt % glycerine; between about 7 wt % and about 17 wt % triethanolamine; and between about 0.1 wt % and about 10 wt % water soluble silicate.

19. The method described in claim 16 wherein the carrier comprises about 40 wt % glycerine; about 12 wt % triethanolamine; and between about 2 wt % and about 4 wt % water soluble silicate.

* * * * *